United States Patent
Mindler et al.

(10) Patent No.: US 11,689,967 B2
(45) Date of Patent: Jun. 27, 2023

(54) SYSTEMS AND METHODS FOR LOAD CONTROL OF A USER DEVICE DURING NETWORK CONGESTION

(71) Applicant: Verizon Patent and Licensing Inc., Basking Ridge, NJ (US)

(72) Inventors: Daniel Mindler, Riegelsville, PA (US); James Mathison, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 89 days.

(21) Appl. No.: 17/247,418

(22) Filed: Dec. 10, 2020

(65) Prior Publication Data
US 2022/0191737 A1   Jun. 16, 2022

(51) Int. Cl.
| | |
|---|---|
| H04W 28/08 | (2023.01) |
| H04W 28/02 | (2009.01) |
| H04W 28/10 | (2009.01) |
| H04W 28/06 | (2009.01) |
| H04L 47/125 | (2022.01) |
| H04L 43/08 | (2022.01) |

(52) U.S. Cl.
CPC ....... *H04W 28/0942* (2020.05); *H04L 47/125* (2013.01); *H04W 28/0268* (2013.01); *H04W 28/0289* (2013.01); *H04W 28/06* (2013.01); *H04W 28/0967* (2020.05); *H04W 28/10* (2013.01); *H04L 43/08* (2013.01)

(58) Field of Classification Search
CPC ......... H04W 28/0942; H04W 28/0268; H04W 28/0289; H04W 28/06; H04W 28/0967; H04W 28/10; H04L 47/125
See application file for complete search history.

(56) References Cited

U.S. PATENT DOCUMENTS

| | | | |
|---|---|---|---|
| 9,137,700 B2 * | 9/2015 | Elefant | H04W 28/02 |
| 9,591,610 B1 * | 3/2017 | Sarkar | H04W 68/02 |
| 2012/0257499 A1 * | 10/2012 | Chatterjee | H04W 28/0284 370/232 |
| 2014/0086052 A1 * | 3/2014 | Cai | H04M 15/8027 370/235 |
| 2015/0135260 A1 * | 5/2015 | Ilyadis | H04L 41/0893 726/1 |
| 2015/0350049 A1 * | 12/2015 | Yang | H04L 43/0882 370/236 |
| 2016/0080275 A1 * | 3/2016 | Kumaresh | H04L 43/0876 709/224 |
| 2018/0098179 A1 * | 4/2018 | Iwai | H04L 41/0893 |
| 2021/0067414 A1 * | 3/2021 | Costa | H04L 41/0893 |

* cited by examiner

*Primary Examiner* — Min Jung

(57) ABSTRACT

Various aspects of the present disclosure generally relate to wireless communication. In some aspects, a device may receive traffic data associated with a coverage area and determine that there is network congestion. If there is network congestion, the device may identify a high-consumption user device. The device may perform a corrective action in connection with a load of the high-consumption user device, such as limit a throughput of the high-consumption user device. The device may perform a corrective action based on a policy obtained from a policy and control function.

20 Claims, 8 Drawing Sheets

SYSTEMS AND METHODS FOR LOAD CONTROL OF A USER DEVICE DURING NETWORK CONGESTION

BACKGROUND

5th Generation/New Radio (5G/NR) is a next generation global wireless technology. 5G/NR provides various enhancements to wireless communications, such as flexible bandwidth allocation, improved spectral efficiency, ultra-reliable low-latency communications (URLLC), beamforming, and/or high-frequency communication (e.g., millimeter wave (mmWave)).

DETAILED DESCRIPTION

Figure 1A:
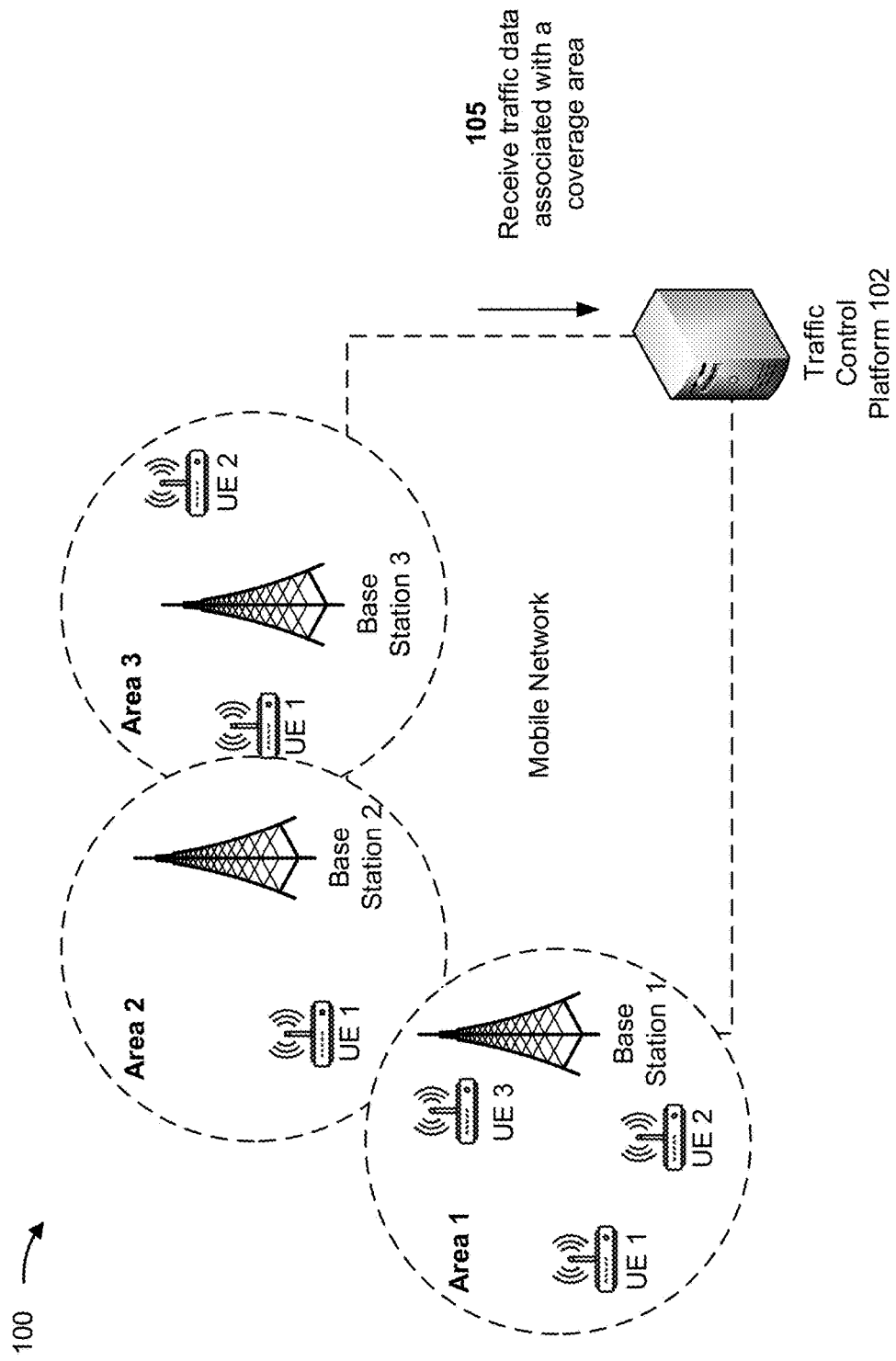
FIGS. 1A-1E are diagrams of an example associated with load control of a user device during network congestion.

The following detailed description of example implementations refers to the accompanying drawings. The same reference numbers in different drawings may identify the same or similar elements.

New Radio (NR) 5G networks may provide for significantly more bandwidth than Long Term Evolution (LTE) 4G networks. While 5G networks grow and are deployed, the 5G subscribers may be serviced by both 4G core networks and 5G core networks. 5G deployment may include adding new 5G network components while reusing existing 4G network components. When a 5G subscriber is able to utilize the ultra-wideband of 5G to download a high volume of data, such as a complete television series, it may become an issue for all subscribers if there is congestion in the network. If there is congestion in the network, a spike in usage by the 5G subscriber may cause an overload situation for a network component in a 4G core network or 5G network, and this overload situation may negatively impact all subscribers. To address this overload situation, a core network device may limit throughput for the network component and do so evenly for all subscribers, as part of a fair application of a remedy. However, the evenly applied remedy reduces service for a large number of subscribers while doing little to address the high consumption of data by the 5G subscriber. The user devices of the other subscribers may still have slower traffic flows during the network congestion despite implementing the evenly applied remedy. The user devices may also have packets dropped while the network is congested, and the user devices may consume power, processing resources, and signaling resources with retransmissions for the dropped packets.

Fair application of a remedy to all subscribers may not be an equitable solution if one 5G subscriber (or a smaller number of 5G subscribers) is partly responsible for an overload situation during network congestion. Some implementations described herein provide a traffic control platform that enables a network component to limit throughput for a high-consumption user device if there is congestion in the network. For example, if congestion satisfies a congestion threshold and a load of a user device of a subscriber satisfies a load threshold (e.g., high consumption), the traffic control platform may limit the throughput specifically for the high-consumption user device. In this way, the traffic control platform may more efficiently address a data usage spike when there is congestion. The traffic control platform enables user devices to conserve resources that would otherwise be consumed by congestion on the network (e.g., retransmissions due to dropped packets). Furthermore, the traffic control platform also enables user devices, core network devices, application network devices, and/or other devices connected via the network to maintain faster traffic flows for the majority of subscribers, and user devices experience less latency and better connection quality.

FIGS. 1A-1E are diagrams of one or more example implementations 100 described herein. As shown in FIGS. 1A-1E, the example implementation(s) 100 may include a traffic control platform 102 and a mobile network (e.g., a 2G network, a 3G network, a 4G network, a long-term evolution (LTE) network, a 5G network, an NR network, or another type of network). The mobile network may include multiple coverage areas that each have one or more base stations that serve user devices. The mobile network may include network components that are core network devices or that may be controlled by core network devices. The core network devices may include a gateway device (e.g., a packet data network gateway (PGW), a serving gateway (SGW), a user plane function (UPF), a service capability exposure function (SCEF), and/or a network exposure function (NEF)).

FIGS. 1A-1E present one or more functions that may be performed by traffic control platform 102 to monitor traffic patterns and control congestion within the mobile network. For example, traffic control platform 102 may receive traffic data associated with a coverage area, determine a congestion threshold associated with the coverage area, and determine whether the traffic data satisfies the congestion threshold, in order to identify congestion in the mobile network. Traffic control platform 102 may identify user devices and network components impacted by the congestion. Traffic control platform 102 may identify a high-consumption user device that is consuming a large amount of bandwidth while the network is congested. Traffic control platform 102 may determine a corrective action to alleviate congestion, and the corrective action may be in connection with a load of the high-consumption user device.

In some implementations, traffic control platform 102 may perform one or more functions in association with a core network device. The core network device may monitor and/or control traffic of the mobile network. The core network device, for example, may collect information relating to a coverage area (e.g., information relating to a 5G next generation NodeB (gNB), an LTE evolved NodeB (eNB), and/or another access point of a radio access network (RAN)), user device (e.g., user equipment (UE), a computer, a smart phone, a mobile device, an internet of things (IoT) device, and/or another user device that is connected to the mobile network), and/or an application network device. The information may be obtained via a registration process, an installation process, an attachment process, and/or an onboarding process, and maintained by a network controller (e.g., an operation, administration, and maintenance (OAM), a self-organizing network (SON), a home subscriber server (HSS), an authentication, authorization, and accounting server (AAA), or another type of device). Traffic control platform 102 may receive the information collected by the core network device and store the information in a data structure on traffic control platform 102 or on a separate device.

As shown in FIG. 1A, and by reference number 105, traffic control platform 102 may receive traffic data associated with a coverage area of the mobile network. The traffic data may be associated with property data that includes information relating to one or more coverage areas (e.g., Area 1, Area 2, and/or Area 3) and/or one or more base stations (e.g., Base Station 1, Base Station 2, and/or Base Station 3) associated with the mobile network. In some examples, property data may include identification information (e.g., an identification number and/or another unique identifier of the coverage area), and/or location information (e.g., geographical coordinates of the base station associated with the coverage area). In some implementations, property data may include information relating to one or more user devices (e.g., UE 1, UE 2, and/or UE 3) associated with a particular coverage area and/or one or more application network devices providing content to the user device. For example, property data may include user device identification information (e.g., an Internet protocol (IP) address, an identification number, and/or another unique identifier of the user device), user device location information (e.g., geographical coordinates of the user equipment), network component information, and/or application network device identification information (e.g., an IP address, a unique identifier of an application network device, and/or a unique identifier of an application onboarded by an application network device).

In some implementations, the traffic data may include information relating to a load level of a particular coverage area at a particular time. For example, traffic data may include a number of unique user devices simultaneously connected to the coverage area, a number of unique radio resource control (RRC) connections, a number of physical resource blocks (PRBs) in use, and/or another indication of the load level of the coverage area. In some cases, traffic data may be provided as a ratio between a number of connections in use and a number of available connections, a percentage of connections in use, traffic latency, and/or another indication of the available capacity of the coverage area. In some implementations, information relating to a capacity limit of the coverage area may be provided by the property data, and the traffic data may be provided in relation to the capacity limit. Traffic control platform 102 may receive the property data and the traffic data from the gateway device, store the property data and/or the traffic data in a data structure accessible by traffic control platform 102, and update the property data and/or the traffic data periodically, intermittently, or continuously in real-time.

Figure 1B:
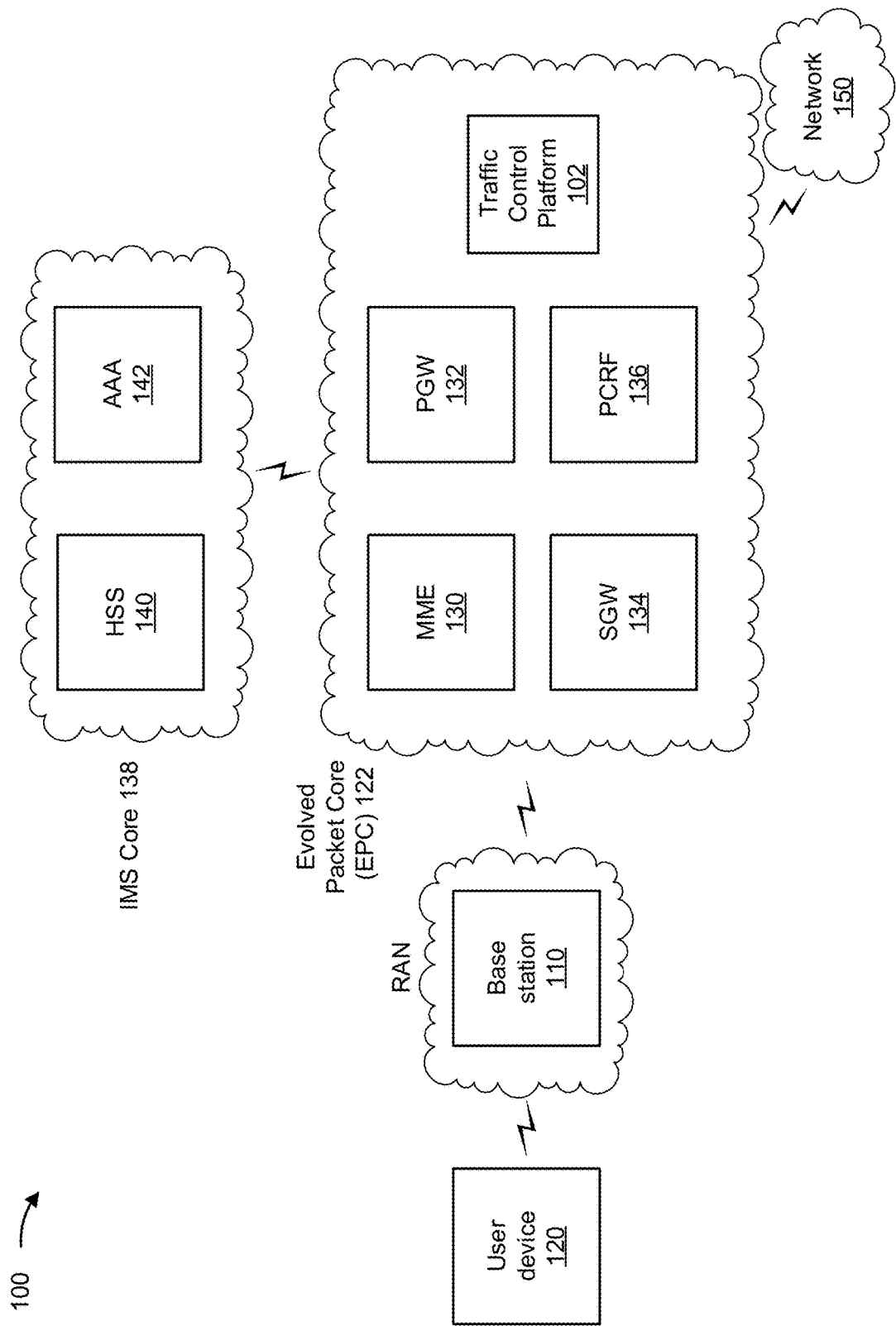

FIG. 1B is a diagram of an example implementation 100 described herein. Example implementation 100 illustrates various portions of a core network configured as a 4G wireless telecommunications system, an LTE wireless telecommunications system, or an LTE-Advanced (LTE-A) wireless telecommunications system.

As shown in FIGS. 1A and 1B, example implementation 100 can include a RAN with a base station 110 that is wirelessly connected to a user device 120. Base station 110 may be connected to a network 150 via an Evolved Packet Core (EPC) 122. EPC 122 may include a mobility management entity device (MME) 130, a packet data network gateway (PGW) 132, a serving gateway (SGW) 134, and a policy and charging rules function (PCRF) 136 to enable user device 120 to communicate with network 150 and/or an IP multimedia subsystem (IMS) core 138. IMS core 138 may include an HSS 140 and an AAA 142. IMS core 138 may manage device registration and authentication or session initiation associated with user device 120. HSS 140 and/or AAA 142 may reside in EPC 122 and/or IMS core 138. EPC 122 and/or IMS core 138 may include the traffic control platform 102. Traffic control platform 102 may include, or control, one or more of the core network devices shown in FIG. 1B. The core network devices shown in FIG. 1B may interconnect via wired connections, wireless connections, or a combination of wired and wireless connections.

Traffic control platform 102 may include, operate with, or operate on one or more of the core network devices to identify network congestion and high-consumption user devices and to limit throughput for the high-consumption user devices. The core network devices will be explained in further detail. MME 130 may include one or more devices, such as one or more server devices, capable of managing authentication, activation, deactivation, and/or mobility functions associated with user device 120. In some implementations, MME 130 may perform operations relating to authentication of user device 120. Additionally, or alternatively, MME 130 may facilitate the selection of a particular SGW 134 and/or a particular PGW 132 to provide traffic to and/or from user device 120. MME 130 may perform operations associated with handing off user device 120 from base station 110 to another base station when user device 120 is transitioning from a first cell associated with base station 110 to a second cell associated with the other base station. Additionally, or alternatively, MME 130 may select another MME (not shown), to which user device 120 should be handed off (e.g., when user device 120 moves out of range of MME 130).

PGW 132 may include one or more devices capable of providing connectivity for user device 120 to external packet data networks (e.g., other than the depicted EPC and/or LTE network). For example, PGW 132 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, PGW 132 may aggregate traffic received from one or more SGWs 134 and may send the aggregated traffic to network 150. Additionally, or alternatively, PGW 132 may receive traffic from network 150 and may send the traffic to user device 120 via SGW 134 and base station 110. PGW 132 may record data usage information (e.g., byte usage) and may provide the data usage information to AAA 142.

SGW 134 may include one or more devices capable of routing packets. For example, SGW 134 may include one or more data processing and/or traffic transfer devices, such as a gateway, a router, a modem, a switch, a firewall, an NIC, a hub, a bridge, a server device, an OADM, or any other type of device that processes and/or transfers traffic. In some implementations, SGW 134 may aggregate traffic received from one or more base stations associated with the LTE network and may send the aggregated traffic to network 150 (e.g., via PGW 132) and/or other network devices associated with the EPC and/or the IMS core. SGW 134 may receive traffic from network 150 and/or other network devices and may send the received traffic to user device 120 via base station 110. Additionally, or alternatively, SGW 134 may perform operations associated with handing off user device 120 to and/or from an LTE network.

PCRF 136 may include one or more devices, such as one or more server devices, capable of providing policy control decision and flow-based charging control functionalities. For example, PCRF 136 may provide network control regarding service data flow detection, gating, and/or quality of service (QoS) and flow-based charging. In some implementations, PCRF 136 may determine how a certain service data flow is to be treated and may ensure that user plane traffic mapping and treatment is in accordance with a user subscription profile.

HSS 140 may include one or more devices, such as one or more server devices, capable of managing (e.g., receiving, generating, storing, processing, providing) information associated with user device 120. For example, HSS 140 may manage subscription information associated with user device 120, such as information that identifies a subscriber profile of a user associated with user device 120, information that identifies services and/or applications that are accessible to user device 120, location information associated with user device 120, a network identifier (e.g., a network address) that identifies user device 120, information that identifies a treatment of user device 120 (e.g., QoS information, a quantity of minutes allowed per time period, a quantity of data consumption allowed per time period), and/or similar information. HSS 140 may provide this information to one or more other devices to support the operations performed by those devices.

AAA 142 may include one or more devices, such as one or more server devices, that perform authentication, authorization, and/or accounting operations for communication sessions associated with user device 120. For example, AAA 142 may perform authentication operations for user device 120 and/or a user of user device 120 (e.g., using one or more credentials), may control access, by user device 120, to a service and/or an application (e.g., based on one or more restrictions, such as time-of-day restrictions, location restrictions, single or multiple access restrictions, read/write restrictions), may track resources consumed by user device 120 (e.g., a quantity of voice minutes consumed, a quantity of data consumed), and/or may perform similar operations. Network 150 may include one or more wired and/or wireless networks.

Traffic control platform 102 may include one or more devices, such as one or more computer devices, capable of receiving, generating, storing, processing, and/or providing information that relates to monitoring and controlling traffic between user device 120, network components, and/or core network devices.

Figure 1C:
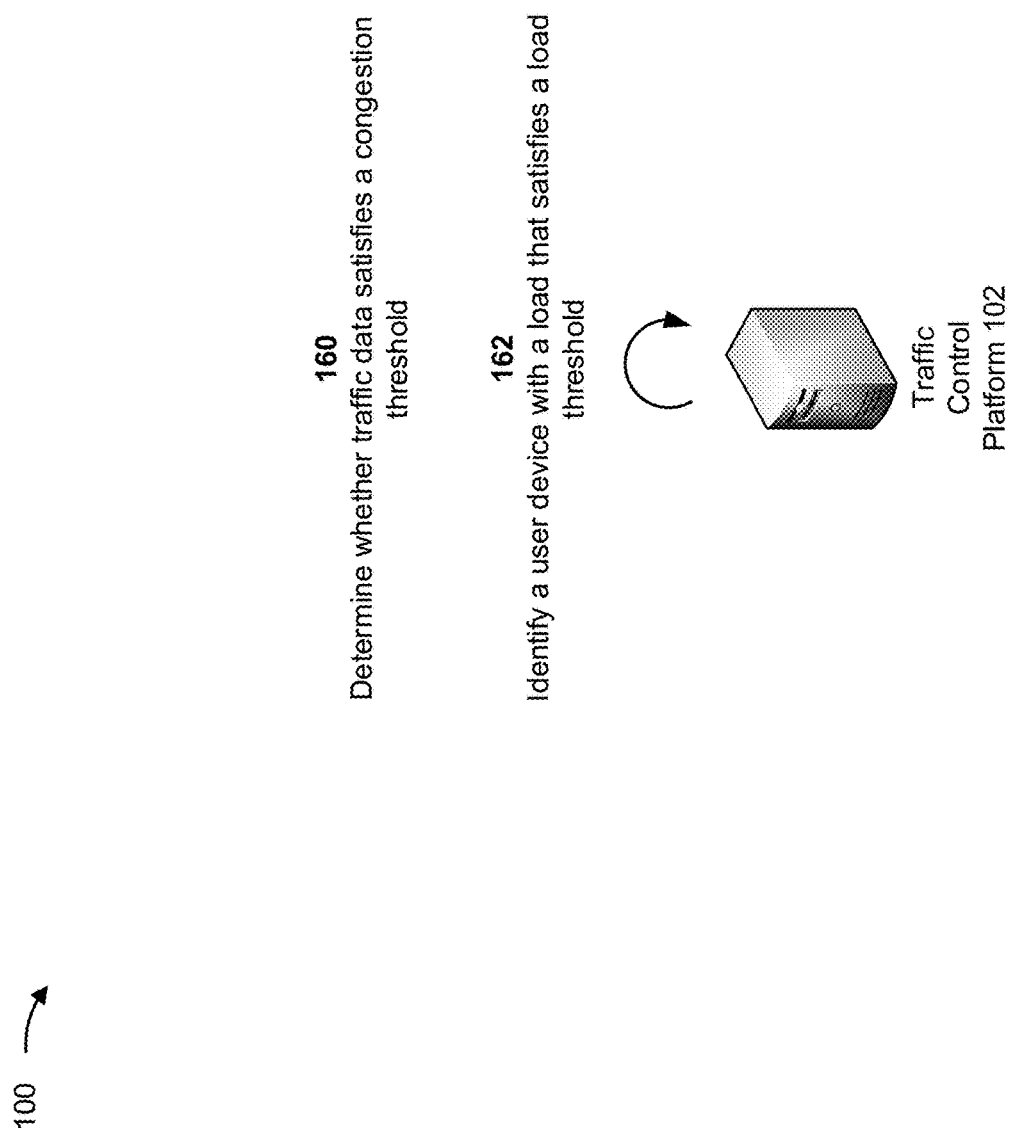

As shown by FIG. 1C, and by reference number 160, traffic control platform 102 may determine whether the traffic data satisfies a congestion threshold, in order to identify a congestion event. Traffic control platform 102 may also identify user devices impacted by the congestion event. For example, the traffic control platform 102 may determine a congestion threshold that is based on an average latency reported by user devices and/or network components. If an average latency received in the traffic data exceeds an average latency threshold for a time duration, traffic control platform 102 may determine that the network, or at least one or more network components, is experiencing congestion. The congestion threshold may also be based on central processing unit (CPU) usage at one or more network components. For example, traffic control platform 102 may determine that the network, or at least one or more network components, is experiencing congestion if the CPU usage exceeds a threshold such as 80%.

If the network is experiencing congestion, traffic control platform 102 may determine if a particular subscriber (or subscribers) is using a high-consumption user device and may limit throughput (e.g., bandwidth, traffic flow, traffic priority) for the high-consumption user device. As shown by reference number 162, traffic control platform 102 may identify a high-consumption user device with a load that satisfies a load threshold. The load threshold may be applicable if there is congestion in the network. If there is no congestion in the network, then the load threshold may not be applicable. For example, a load threshold may be 1 gigabit per second (Gbps) for a single user device if the network is congested. If a load (e.g., throughput) of a particular user device exceeds 1 Gbps during network congestion (e.g., a user utilizes 5 Gbps to download the entirety of a high-definition television series), traffic control platform 102 may identify the particular user device to be a high-consumption user device. Traffic control platform 102 may determine to take a corrective action to limit throughput for the high-consumption user device, unless the high-consumption user device is not subject to corrective action due to a status of the subscriber (e.g., premium subscriber as indicated by an HSS or a unified data management (UDM), public safety subscriber).

Figure 1D:
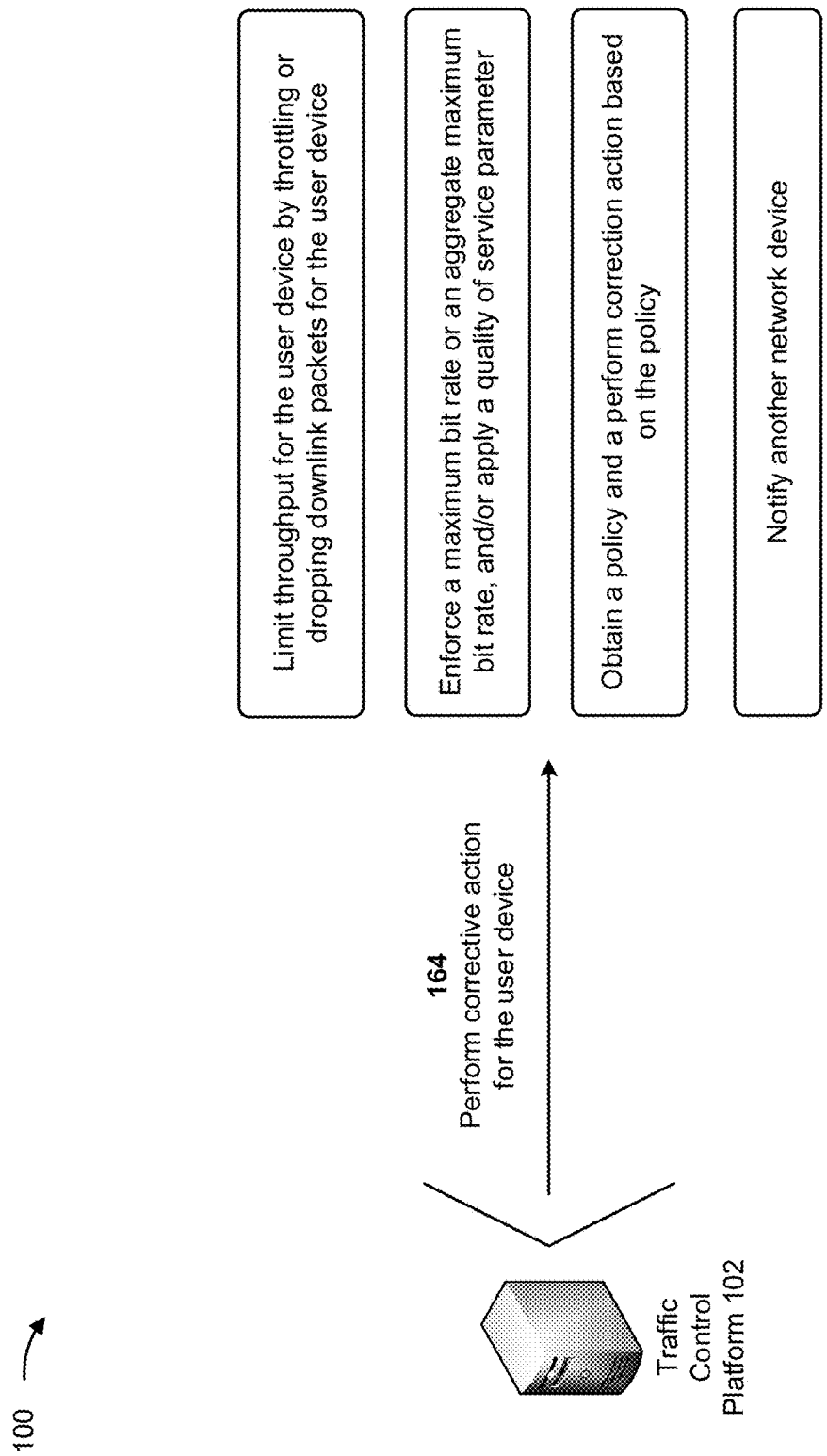

A currently utilized approach to alleviate congestion at a network component is to limit throughput evenly for all user devices having traffic passing through the network component. In some circumstances, (e.g., when all users are using similar devices), this is considered to be fair, but with 5G high-consumption user devices, this would not be fair to all the other non-high-consumption user devices. For example, limiting all devices by a certain percentage (e.g. 10%, 20%, or another amount) would not be fair to devices that are already using few resources if 10% or 20% for the high-consumption user device does not substantially alleviate the network congestion. Therefore, traffic control platform 102 may take corrective action to limit throughput differently for the high-consumption user device. As shown by FIG. 1D, and by reference number 164, traffic control platform 102 may determine and perform a corrective action for the high-consumption user device. The corrective action is intended to help alleviate the congestion event.

In some implementations, traffic control platform 102 may limit throughput for the high-consumption user device by throttling the throughput of the high-consumption user device's usage. For example, if network congestion involves 80% CPU usage of network components, traffic control platform 102 may limit throughput for the high-consumption user device to a particular data rate (e.g., 1 Gbps). In some implementations, traffic control platform 102 may limit throughput for the high-consumption user device by implementing a limit on traffic for all network devices or a subset of network devices using a network component. For example, traffic control platform 102 may limit throughput to 1 Gbps for all devices of a network component, having the effect of limiting only the high-consumption user device that is downloading data at 5 Gbps. Other user devices downloading at 3 Gbps or 4 Gbps may also be limited, but the remaining user devices at or below 1 Gbps may not be affected by the throughput limit and may benefit from such a blanket limit.

In some implementations, traffic control platform 102 may use a stepped-limiting mechanism. For example, if network congestion is 85% CPU usage, for example, traffic control platform 102 may cause a network component to limit throughput for the high-consumption user device to a first data rate (e.g., 750 megabits per second (Mbps)). If CPU usage is 90%, for example, throughput may be limited to a second, lower data rate (e.g., 500 Mbps). If CPU usage is 95%, throughput may be limited to 250 Mbps. These usages and throughputs are provided as examples, and traffic control platform 102 may select other throughputs or limiting measures based on different thresholds. In some implementations, traffic control platform 102 may cause a network component to drop packets for the high-consumption user device. For example, if CPU usage is above 80%, a defined percentage of packets for the high-consumption user device may be dropped. Traffic control platform 102 may also use a stepped-limiting mechanism for dropping packets, where a higher CPU usage corresponds to a higher percentage of packets that are purposely dropped.

In some implementations, traffic control platform 102 may enforce a maximum bit rate (MBR), enforce an aggregate maximum bit rate (AMBR), or apply a QoS parameter for the high-consumption user device. For example, traffic control platform 102 may enforce an MBR (e.g., 1 Gbps) for a particular QoS flow of the high-consumption user device. Traffic control platform 102 may instruct a PGW to implement an MBR limit for a video flow of the high-consumption user device. In some implementations, traffic control platform 102 may enforce an access point name AMBR (APN-AMBR). The APN-AMBR may be a bit rate for an aggregate of data downloads for the high-consumption user device or for an aggregate of multiple high-consumption user devices. For example, traffic control platform 102 may instruct the PGW to implement an APN-AMBR limit that limits the aggregate of data usage for all QoS flows for the high-consumption user device.

In some implementations, traffic control platform 102 may obtain a policy or cause a network component (e.g., SGW, PGW) to obtain a policy, such as from a PCRF, and perform the corrective action based on the policy. For example, in a scenario with 4G, traffic control platform 102 may provide information to a PGW, where the information indicates that the network is congested and that there is a high-consumption user device served by the PGW. The information may indicate a congestion level of the network (e.g., latency, CPU usage) and/or how much bandwidth the high-consumption user device is using. Traffic control platform 102 may instruct the PGW to obtain a policy from a PCRF for addressing high-consumption devices. The PGW may obtain a policy from the PCRF that indicates a limiting behavior for high-consumption user devices. The behavior may include throttling throughput, reducing a priority of traffic, dropping packets, periodic pausing of traffic, or other limiting mechanisms. In some implementations, the PGW or the SGW may have a stored policy for limiting mechanisms and may refer to the stored policy for enforcing a throughput limit, such as holding a high-consumption user device to a maximum throughput, dropping packets, and/or reducing a priority of traffic for the high-consumption user device. The policy may specify, for example, that a user device may use no more than 100% of an average throughput for a coverage area. The policy may be stored during session setup.

To limit throughput, some core network devices, such as devices with a PGW, may set an MBR or an APN-AMBR. Other core network devices, such as devices with an SGW, may take immediate action by dropping packets for a high-consumption user device. However, in some implementations, traffic control platform 102 may notify other core network devices, or cause a network component to notify a core network device, to limit throughput for a high-consumption device. For example, traffic control platform 102 may cause an SGW to notify a PGW over an S5 interface that a high-consumption user device is overloading a network component. The PGW may then limit the throughput of the high-consumption user device.

Figure 1E:
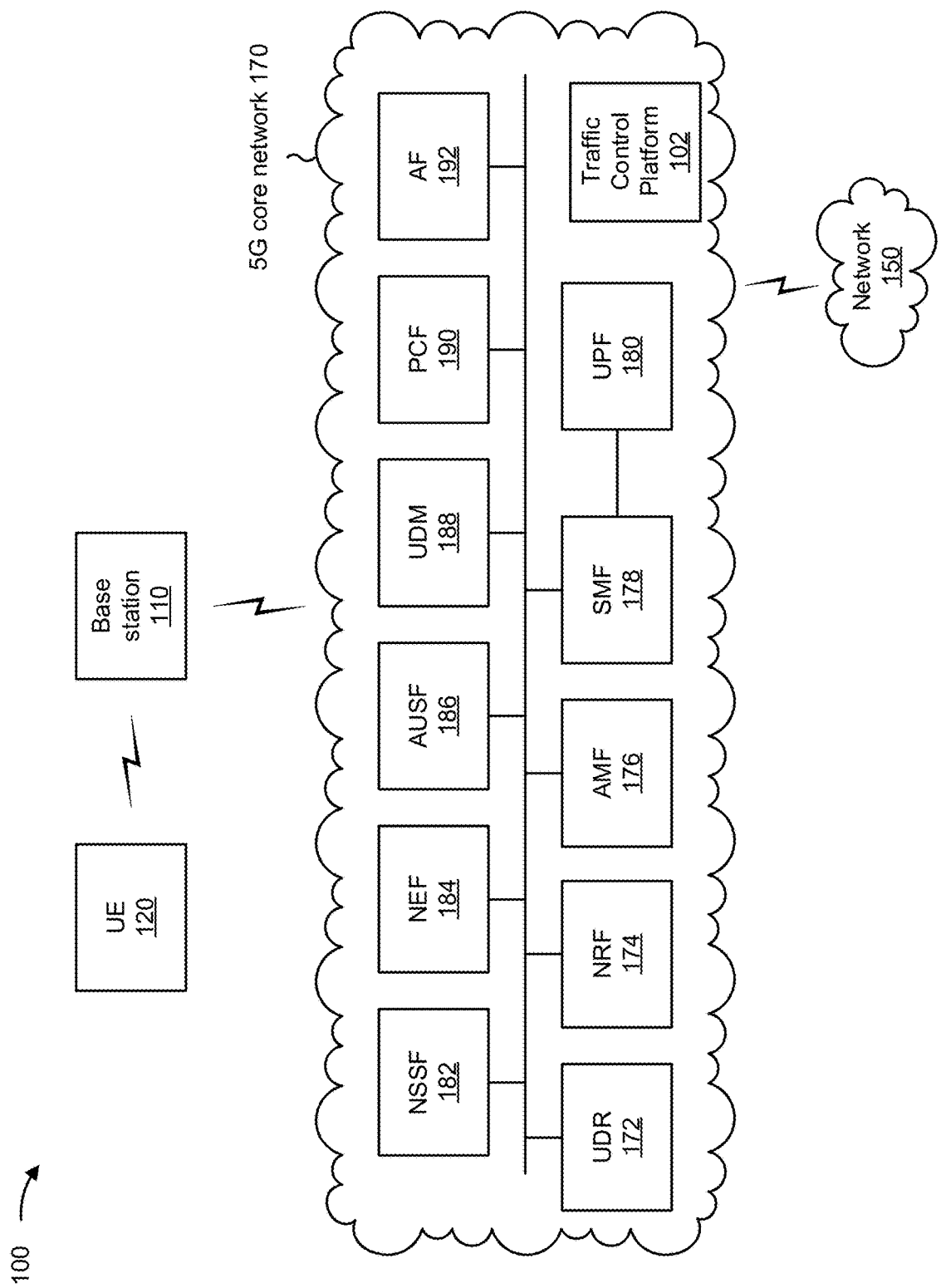

FIG. 1E is an example of traffic control platform 102 operating with or in a 5G core network 170. The 5G core network 170 may have a wired or wireless connection to one or more base stations 110 of a RAN. Base station 110 may include a gNodeB (gNB), a base station subsystem, a cellular site, a cellular tower, a transmit receive point (TRP), a macrocell base stations, microcell base stations, picocell base stations, femtocell base stations, or similar types of devices that can support wireless communication for user device 120.

As shown in FIG. 1E, 5G core network 170 may include a number of functional elements. The functional elements may include, for example, a unified data repository (UDR) 172, a network resource function (NRF) 174, an access and mobility management function (AMF) 176, a session management function (SMF) 178, a UPF 180, a network slice selection function (NSSF) 182, a network exposure function (NEF) 184, an authentication server function (AUSF) 186, a unified data management (UDM) component 188, a policy control function (PCF) 190, and/or an application function (AF) 192. These functional elements may be communicatively connected via a message bus. Each of the functional elements shown in FIG. 1E is implemented on one or more core network devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment. A message bus may represent a communication structure for communication among the functional elements. In other words, the message bus may permit communication between two or more functional elements.

NSSF 182 may include one or more devices that select network slice instances for user device 120. By providing network slicing, NSSF 182 allows an operator to deploy multiple substantially independent end-to-end networks potentially with the same infrastructure. In some implementations, each slice may be customized for different services.

NEF 184 may include one or more devices that support exposure of capabilities and/or events in the wireless telecommunications system to help other entities in the wireless telecommunications system discover network services. AUSF 186 may include one or more devices that act as an authentication server and support the process of authenticating user device 120 in the wireless telecommunications system. UDM 188 may include one or more devices that store user data and profiles in the wireless telecommunications system. UDM 188 may be used for fixed access and/or mobile access in 5G core network 170.

PCF 190 may include one or more devices that provide a policy framework that incorporates network slicing, roaming, packet processing, and/or mobility management. PCF 190 may configure traffic steering policies, such as UE route selection policies (URSPs), at UPF 180. AF 192 may include one or more devices that support application influence on traffic routing, access to NEF 184, and/or policy control. AMF 176 may include one or more devices that act as a termination point for non-access stratum (NAS) signaling, and/or mobility management. SMF 178 may include one or more devices that support the establishment, modification, and release of communication sessions in the wireless telecommunications system. SMF 178 may enforce user equipment IP address allocation and policies.

Some core network devices may control traffic data for particular user devices, similar to SGW 134 or PGW 132 of the 4G core network shown in FIG. 1B. For example, in some implementations, UPF 180 may include one or more devices that serve as an anchor point for intra-RAT and/or inter-RAT mobility. UPF 180 may apply rules to packets, such as rules pertaining to packet routing, traffic reporting, and/or handling user plane QoS. In some implementations, NSSF 182 may determine a set of network slice policies to be considered when selecting a network slice instance (NSI). The set of network policies can set rules and/or requirements at a network level (e.g., for all or a subset of user devices, for all or specific applications, for all or specific geographic areas) and/or a user level (e.g., per user device, per application). The set of network slice policies, which can be maintained by PCF 190, may include an area capacity policy (e.g., a data rate capacity over an area), a mobility policy (e.g., location and speeds of user device), a density policy (e.g., a number of communications sessions over an area), a guaranteed minimum data rate policy (e.g., minimum download and upload speeds), an MBR policy (e.g., maximum download and upload bitrates), a protocol data unit (PDU) session AMBR policy, a relative priority policy (e.g., relative importance of the application and/or user device compared to other applications and/or user devices), an absolute priority policy (e.g., objective importance of the application and/or user device compared to other applications and/or user devices), a latency rate policy (e.g., an end-to-end communications transmission time), a reliability policy (e.g., a communications transmission success rate), and/or a resource scaling policy (e.g., an ability or range for scaling resources up or down). In some implementations, the set of network slice policies can define a low latency performance requirement (e.g., an end-to-end communications transmission time less than or equal to a threshold, such as about 10 ms), a high latency performance requirement (e.g., an end-to-end communications transmission time greater than a threshold, such as about 10 ms), a low reliability performance requirement (e.g., a communications transmission success rate less than a threshold, such as 99.99%), a high reliability performance requirement (e.g., a communications transmission success rate greater than or equal to a threshold, such as 99.99%), a high data rate performance requirement (e.g., download and upload speeds above a threshold, such as about 50 Mbps), a low data rate performance requirement (e.g., download and upload speeds less than or equal to a threshold, such as about 50 Mbps), a high traffic density requirement (e.g., greater than or equal to a threshold number of user devices per geographical area, such as about 10,000 user devices per square kilometer), and/or a low traffic density requirement (e.g., less than a threshold number of user devices per geographical area, such as about 10,000 user devices per square kilometer). In some implementations, the set of network slice policies can define a category for a service of a communication session.

In some implementations, traffic control platform 102 may perform a corrective action in the 5G core network 170. For example, traffic control platform 102 may provide information to SMF 178 that indicates that the network is congested and that there is a high-consumption user device served by SMF 178 and UPF 180. The information may indicate a congestion level of the network (e.g., latency, CPU usage) and/or how much bandwidth the high-consumption user device is using. Traffic control platform 102 may instruct SMF 178 to obtain a policy from PCF 190 for addressing high-consumption devices. SMF 178 may provide the policy to UPF 180 to enforce the policy. In some implementations, UPF 180 may have a stored policy for limiting mechanisms and may refer to the stored policy for enforcing a throughput limit, such as holding a high-consumption user device to a maximum throughput, dropping packets, and/or reducing a priority of traffic for the high-consumption user device.

In some implementations, the core network devices may notify other core network devices to limit throughput. For example, UPF 180 may notify SMF 178 of a high-consumption user device, or SMF 178 may notify UPF 180 of the high-consumption user device. Accordingly, UPF 180 or SMF 178 may take action to limit throughput for the high-consumption user device.

In some implementations, traffic control platform 102 may apply a QoS parameter. This may include reducing a priority of traffic for the high-consumption user device. For example, the priority of traffic for the high-consumption device may be reduced to a "best effort" priority for at least a percentage of the traffic for the high-consumption user device. A best effort priority may not provide any guarantee that data may meet a particular QoS.

By limiting throughput for a high-consumption subscriber during network congestion, traffic control platform 102 may alleviate network congestion in a more efficient manner that is fairer to a larger number of subscribers. Alleviating congestion by limiting throughput for a high-consumption user device may improve traffic flows and subscriber experiences for many other user devices. Alleviating congestion for the other user devices reduces dropped packets and the consumption of processing resources and signaling resources associated with retransmissions for the dropped packets. Note that while a 5G subscriber may be described herein as a high-consumption user device, in some examples, a 4G subscriber may be a high-consumption user device.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
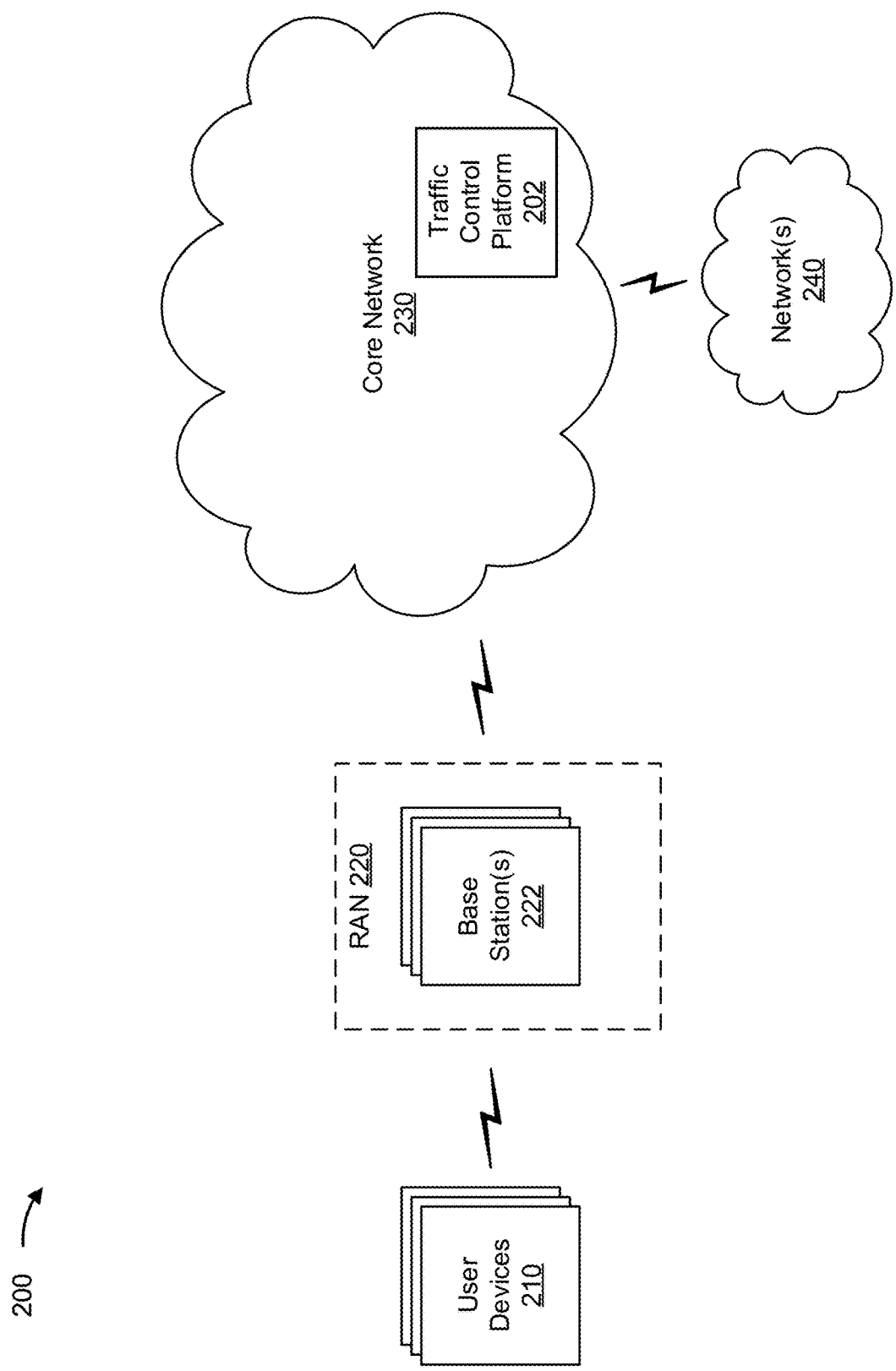
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user devices 210, base stations 222 of RAN 220, a core network 230 in communication with traffic control platform 202, and a network(s) 240. Devices of environment 200 may interconnect via wired connections, wireless connections, or a combination of wired and wireless connections.

User devices 210 may each include a device capable of communicating with other user devices, base stations 222, and/or a network (e.g., network 240). For example, user device 210 may include a mobile phone (e.g., a UE, a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. User device 210 may send traffic to and/or receive traffic from another user device and/or network 240 (e.g., via base station 222, an SGW of core network 230, a PGW of core network 230, or another device).

RAN 220 may include base stations 222 and be operatively connected, via a wired, optical, and/or wireless connection, to the core network 230 through an SGW or UPF of core network 230. RAN 220 may facilitate communication sessions between user devices 210 and data network 240 by communicating application-specific data between RAN 220 and core network 230.

Base stations 222 of RAN 220 may include one or more devices capable of transferring traffic, such as audio, video, text, and/or other traffic, destined for and/or received from user device 210. In some implementations, base stations 222 may include an eNB associated with the LTE network that receives traffic from and/or sends traffic to network 240 via an SGW and/or PGW. Additionally, or alternatively, one or more base stations 222 may be associated with a RAN that is not associated with the LTE network. Base stations 222 may include a gNB associated with a 5G network that receives traffic from and/or sends traffic to network 240 via a UPF.

Base stations 222 may send traffic to and/or receive traffic from user device 210 via an air interface. In some implementations, base station 222 may include a small cell base station, such as a base station of a microcell, a picocell, or a femtocell. Base station 222 may include a cellular site, a cellular tower, an access point, or a TRP. Base station 222 may transfer traffic with user device 210 (e.g., using a cellular radio access technology (RAT)), other base stations 222 (e.g., using a wireless interface or a backhaul interface, such as a wired backhaul interface), and/or network 240. Base stations 222 may provide one or more cells that cover geographic areas. Some base stations 222 may be mobile base stations. Some base stations 222 may be capable of communicating using multiple RATs.

In some implementations, base stations 222 may perform scheduling and/or resource management for user devices 210 covered by base station 222 (e.g., user devices 210 covered by a cell provided by base stations 222). In some implementations, base stations 222 may be controlled or coordinated by a network controller in RAN 220, which may perform load balancing, network-level configuration, and/or the like. The network controller may communicate with base stations 222 via a wireless or wireline backhaul. In some implementations, base station 222 may include a network controller, a SON module or component, or a similar module or component. In other words, base station 222 may perform network control, scheduling, and/or network management functions (e.g., for other base stations and/or for uplink, downlink, and/or sidelink communications of user devices 210 covered by base station 222). In some implementations, base station 222 may include a central unit and multiple distributed units. The central unit may coordinate access control and communication with regard to the multiple distributed units. The multiple distributed units may provide user devices 210 and/or other base stations 222 with access to network 240. In some implementations, traffic control platform 202 may cause a base station 222 to limit throughput for a high-consumption user device or to notify a core network device to limit throughput for the high-consumption user device.

Core network 230 may include a 4G core network as described in connection with FIG. 1B or a 5G core network as described in connection with FIG. 1E. Traffic control platform 202 may be included in core network 230. Traffic control platform 202 may include one or more core network devices in core network 230. In some implementations, core network 230 may communicate with core network devices in core network 230.

Network 240 may include one or more wired and/or wireless networks. For example, network 240 may include a cellular network (e.g., a 5G network, an LTE 4G network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 4 may be implemented as multiple, distributed devices. Additionally, or alternatively, a set of devices (e.g., one or more devices) of environment 200 may perform one or more functions described as being performed by another set of devices of environment 200.

Figure 3:
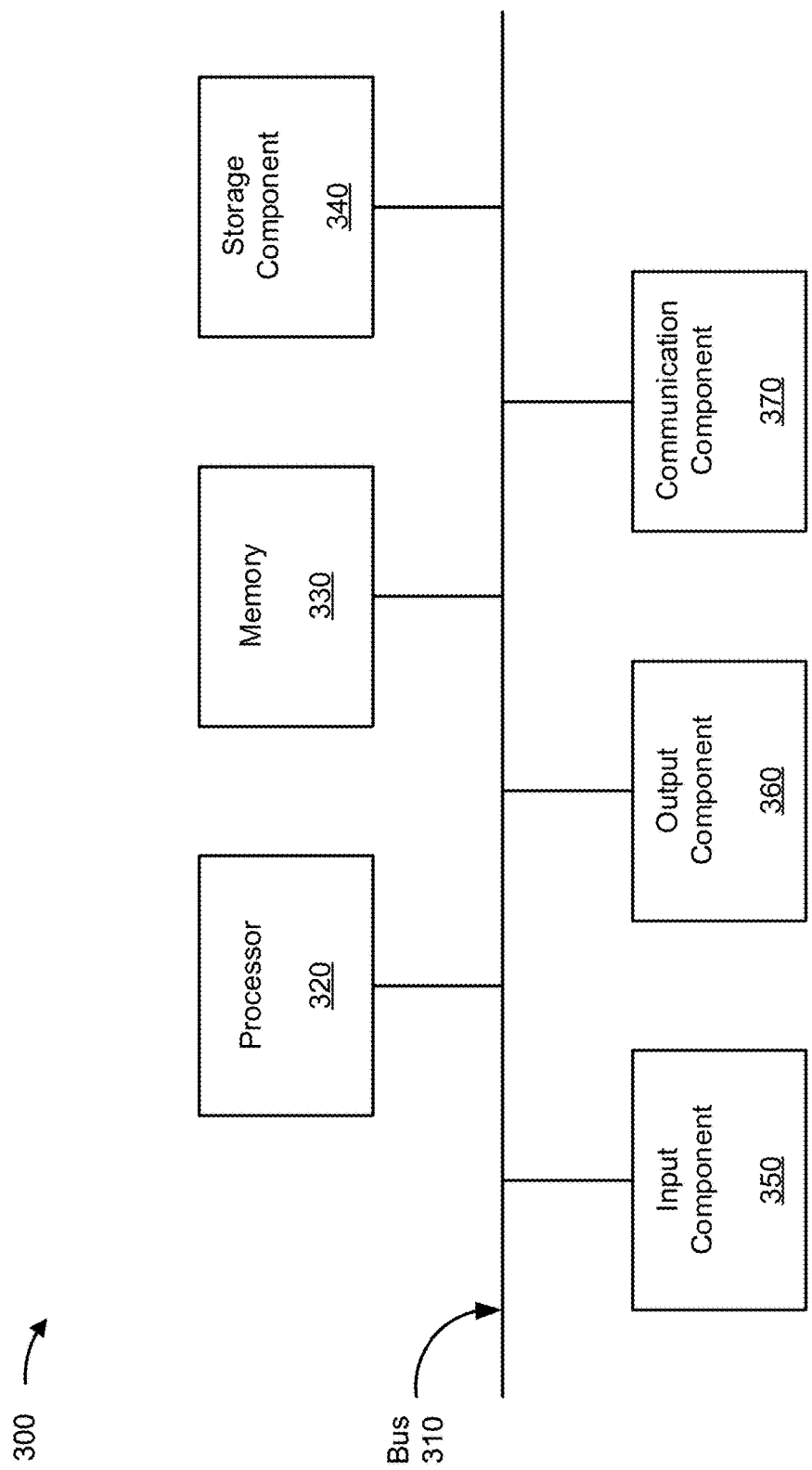
FIG. 3 is a diagram of example components of one or more devices of FIG. 2.

FIG. 3 is a diagram of example components of a device 300, which may correspond to a device of traffic control platform 202, a core network device, or other network component that may limit throughput for a high-consumption user device. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a CPU, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
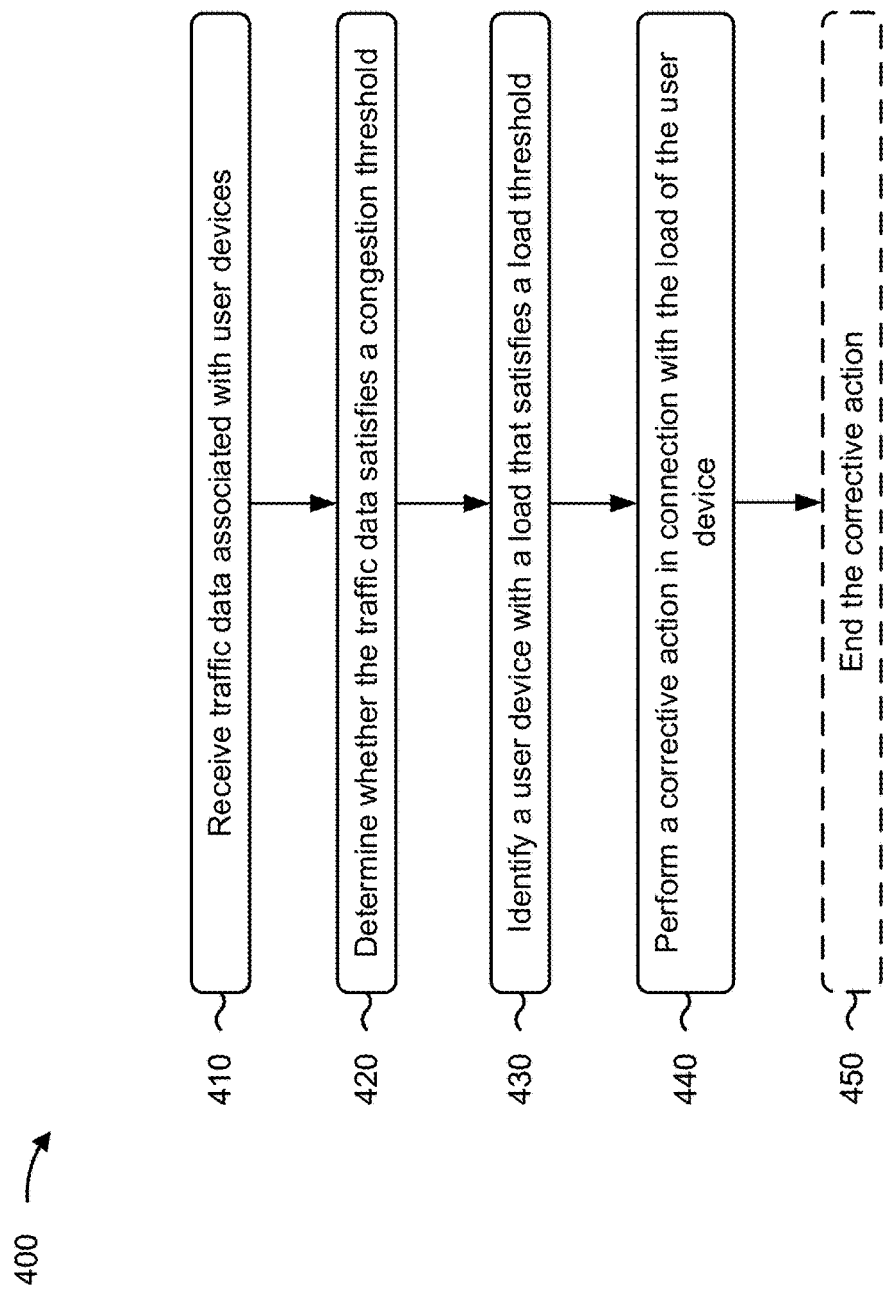
FIG. 4 is a flowchart of an example process relating to load control of a user device during network congestion.

FIG. 4 is a flowchart of an example process 400 associated with systems and methods for load control of a user device during network congestion. In some implementations, one or more process blocks of FIG. 4 may be performed by a device (e.g., device of traffic control platform 102). In some implementations, one or more process blocks of FIG. 4 may be performed by another device or a group of devices separate from or including the device, such as a core network device (e.g., PGW 132, SGW 134, SMF 178, UPF 180), a base station, and/or another network component. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving traffic data associated with user devices in a coverage area (block 410). For example, the device may receive traffic data associated with user devices in a coverage area, as described above. The traffic data may include latency information for communications between network components and user devices or between network components and core network devices. The traffic data may include CPU usage information for one or more network components.

As further shown in FIG. 4, process 400 may include determining whether the traffic data satisfies a congestion threshold (block 420). For example, the device may determine whether the traffic data satisfies a congestion threshold, as described above. The congestion threshold may be a latency threshold or a CPU usage threshold. The congestion threshold may be based on other traffic data, such as a number of dropped packets during a duration of time, or a number of retransmissions during a duration of time. The congestion threshold may also include an amount of traffic flow through one or more network components.

As further shown in FIG. 4, process 400 may include identifying, based on determining that the traffic data satisfies the congestion threshold, a user device with a load that satisfies a load threshold (block 430). For example, the device may identify, based on determining that the traffic data satisfies the congestion threshold, a high-consumption user device with a load that satisfies a load threshold, as described above. The high-consumption user device may be identified in association with subscriber information, such as 5G subscriber information. The high-consumption user device may be identified by an amount of throughput over a period of time, throughput spikes, and/or a relative impact on network congestion. The high-consumption user device may also be identified based on a relative throughput compared to an average throughput. For example, a high-consumption user device may have a throughput of 5-10 Gbps while an average throughput for non-5G subscribers may be 10-25 Mbps. In some implementations, the device may identify a core network device associated with providing service to the user device and transmit, to the core network device, an indication that the load of the high-consumption user device satisfies the load threshold and that the throughout for the high-consumption user device should be limited.

As further shown in FIG. 4, process 400 may include performing a corrective action in connection with the load of the high-consumption user device (block 440). For example, the device may perform a corrective action in connection with the load of the high-consumption user device, as described above. In some implementations, the device includes a PGW or UPF, and performing the corrective action includes limiting throughput for the high-consumption user device by enforcing an MBR or an APN-AMBR, and/or applying a QoS parameter. In some implementations, the device includes an SGW, and performing the corrective action includes limiting throughput for the user device by throttling or dropping downlink packets for the user device. The throttling may include a stepped-limiting mechanism that varies a throughput limit of the high-consumption user device based on a level of network congestion.

In some implementations, the core network device includes a PCF (or a PCRF), PGW, SGW, or UPF. In some implementations, performing the corrective action includes obtaining, from the PCF or PCRF, a policy for limiting the load of the high-consumption user device and performing the corrective action includes performing the corrective action based on the policy. The PGW, SGW, or UPF may receive presence reports and/or preloaded instructions for a stimulus response. The policy may limit throughput for the high-consumption user device for a specified duration of time before ending a throughput limit.

In some implementations, process 400 includes receiving updated traffic data for the coverage area, determining whether the updated traffic data satisfies another congestion threshold, and revising the corrective action based on determining that the updated traffic data satisfies another congestion threshold. The other congestion threshold may be part of a stepped-limiting mechanism. There may be multiple congestion thresholds at varying levels. If a next congestion threshold among the multiple congestion thresholds is met, a throughput limit may be adjusted to a limit that corresponds to the next congestion threshold. This may include adjusting a throughput upward or downward.

In some implementations, process 400 includes ending the corrective action based on determining that the updated traffic data does not satisfy the congestion threshold (block 450). For example, the device may end the corrective action based on determining that the updated traffic does not satisfy the congestion threshold, as described above. In some implementations, process 400 includes transmitting, to a core network device, an indication to end the corrective action based on determining that the updated load data does not satisfy the congestion threshold. In some implementations, ending the corrective action may include a "smart" removal of the correction action. For example, the corrective action may last for a minimum amount of time so as to avoid flip-flopping between the corrective action and no corrective action. The corrective action may also be slowly removed. For example, process 400 may include ending the corrective action by increasing a throughput limit by a specified rate and/over a specified period of time.

In some implementations, a core network device includes a PGW or UPF that receives an indication. The indication may include an instruction to limit throughput for the high-consumption user device by enforcing an MBR or an APN-AMBR, and/or applying a QoS parameter for the high-consumption user device. In some implementations, a core network device includes an SGW, and the indication includes an instruction to limit throughput for the high-consumption user device by dropping packets for the high-consumption user device. The indication may be to change a throttle speed based on the updated traffic data.

In some implementations, process 400 includes identifying a core network device or network component from among network devices providing service for the high-consumption user device. Process 400 may further include instructing the core network device or network component to perform a corrective action to reduce throughput for a subset of traffic or for the whole core network device or network component. In this way, a traffic control platform may limit throughput for high-consumption devices in a coverage area when there is network congestion. All user devices in the coverage area may experience better traffic flow and reduced consumption of processing and signaling resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device in a core network, traffic data associated with a coverage area;
   determining, by the device, whether the traffic data satisfies a congestion threshold based on processing unit usage at one or more network components of the core network;
   identifying, by the device and based on determining that the traffic data satisfies the congestion threshold, a user device, in the coverage area, with a load that satisfies a load threshold;
   obtaining, by the device from a policy and control function, a policy for limiting the load of the user device; and
   limiting, by the device based on the policy, the load of the user device,
      wherein limiting the load of the user device comprises using a stepped-limiting mechanism associated with the processing unit usage.

2. The method of claim 1, wherein the device includes a packet data network gateway or a user plane function, and wherein limiting the load of the user device includes limiting throughput for the user device by one or more of enforcing a maximum bit rate for the user device, enforcing an aggregate maximum bit rate (AMBR) for the user device, or applying a quality of service parameter for the user device.

3. The method of claim 2, wherein enforcing the AMBR includes enforcing an access point name,
wherein the access point name includes a bit rate for an aggregate of data downloads for high-consumption user device or for an aggregate of multiple high-consumption user devices.

4. The method of claim 1, wherein the device includes a serving gateway, and wherein limiting the load of the user device includes limiting throughput for the user device by throttling or dropping downlink packets for the user device.

5. The method of claim 1, further comprising:
identifying, by the device, a core network device associated with providing service to the user device; and
transmitting, by the device to the core network device, an indication that the load of the user device satisfies the load threshold.

6. The method of claim 5, wherein the core network device includes one or more of the policy and control function, a packet data network gateway, a serving gateway, a session management function, or a user plane function.

7. The method of claim 1, further comprising:
receiving, by the device, updated traffic data for the coverage area,
wherein the updated traffic data includes traffic data received after limiting the load of the user device;
determining, by the device, whether the updated traffic data satisfies another congestion threshold; and
revising, by the device, the limiting of the load of the user device based on determining that the updated traffic data satisfies another congestion threshold.

8. The method of claim 1, further comprising:
receiving, by the device, updated traffic data for the coverage area,
wherein the updated traffic data includes traffic data received after limiting the load of the user device;
determining, by the device, whether the updated traffic data satisfies the congestion threshold; and
ending, by the device, the limiting of the load of the user device based on determining that the updated traffic does not satisfy the congestion threshold.

9. A device, comprising:
one or more processors configured to:
receive traffic data associated with a coverage area;
determine whether the traffic data satisfies a congestion threshold based on processing unit usage at one or more network components of a core network;
identify, based on determining that the traffic data satisfies the congestion threshold, a user device with a load that satisfies a load threshold; and
transmit, to a network device, an indication to obtain a policy for limiting the load of the user device from a policy and control function and to perform a corrective action to limit the load of the user device based on the policy,
wherein limiting the load of the user device comprises using a stepped-limiting mechanism associated with the processing unit usage.

10. The device of claim 9, wherein the network device includes a packet data network gateway or a user plane function, and wherein the indication includes an instruction to limit throughput for the user device by one or more of enforcing a maximum bit rate, enforcing an aggregate maximum bit rate, or applying a quality of service parameter for the user device.

11. The device of claim 9, wherein the network device includes a serving gateway or a session management function, and wherein the indication includes an instruction to limit throughput for the user device by dropping packets for the user device.

12. The device of claim 9, wherein the network device includes a packet data network gateway or a user plane function.

13. The device of claim 9, wherein the one or more processors, when performing the corrective action, are further configured to identify the network device from among network devices providing service for the user device.

14. The device of claim 9, wherein the network device includes the policy and control function.

15. The device of claim 9, wherein the one or more processors are further configured to:
receive updated load data for the coverage area,
wherein the updated load data includes information associated with a load level of the coverage area after the corrective action has been performed; and
transmit, to the network device, an indication to end the corrective action based on determining that the updated load data does not satisfy the congestion threshold.

16. A non-transitory computer-readable medium storing a set of instructions, the set of instructions comprising:
one or more instructions that, when executed by one or more processors of a device of a core network, cause the device to:
receive an indication that traffic data of a coverage area satisfies a congestion threshold and that a load of a user device in the coverage area satisfies a load threshold based on processing unit usage at one or more network components of the core network;
identify, based on receiving the indication, data traffic flows for the user device; and
perform a corrective action in connection with the data traffic flows for the user device,
wherein the one or more instructions, that cause the one or more processors to perform the corrective action are configured to perform the corrective action based on using a stepped-limiting mechanism associated with the processing unit usage.

17. The non-transitory computer-readable medium of claim 16, wherein the one or more instructions, when executed by the one or more processors, further cause the device to perform the corrective action or not perform the corrective action based on a subscriber profile for the user device.

18. The non-transitory computer-readable medium of claim 16, wherein the one or more instructions, when executed by the one or more processors, further cause the device to, based on receiving the indication, enforce an aggregate maximum bit rate of the data traffic flows or apply a quality of service parameter for the data traffic flows.

19. The non-transitory computer-readable medium of claim 16, wherein the one or more instructions, when executed by the one or more processors, further cause the device to throttle or drop downlink packets for the user device for a time duration after receiving the indication.

20. The non-transitory computer-readable medium of claim 19, wherein the one or more instructions, when executed by the one or more processors, further cause the device to:

receive updated traffic data for the coverage area,
  wherein the updated traffic data includes traffic data received after the corrective action has been performed; and
change a throttle speed based on the updated traffic data.

\* \* \* \* \*